Patented Dec. 1, 1931

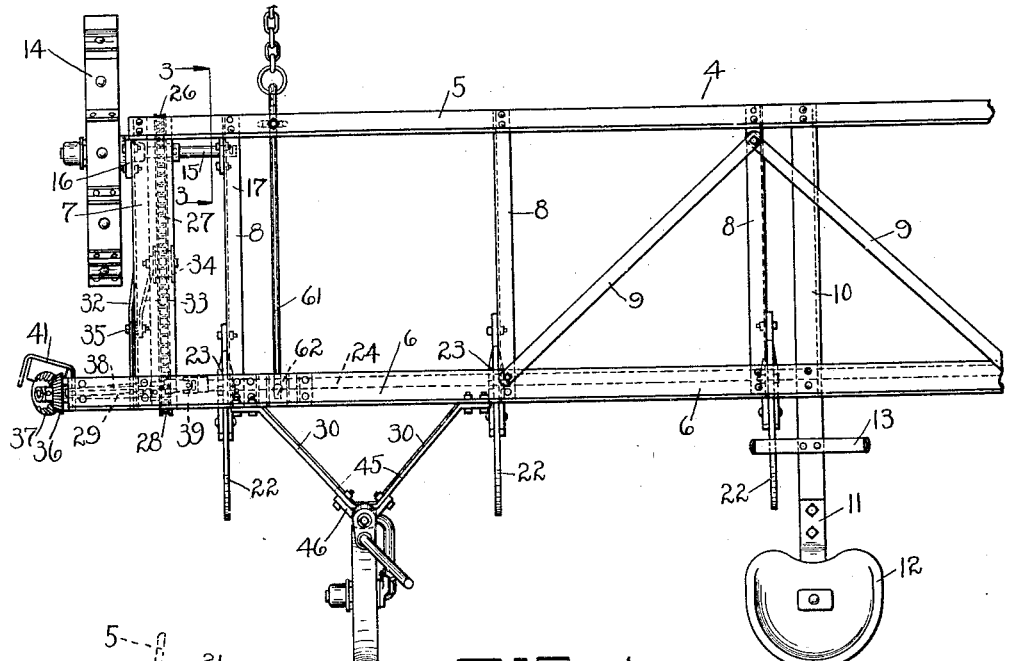
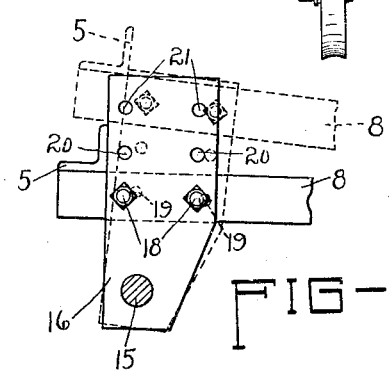
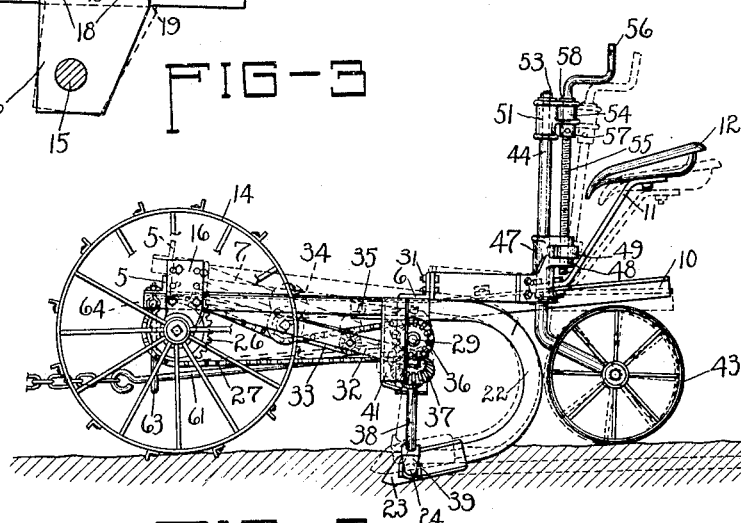

1,834,185

UNITED STATES PATENT OFFICE

FREDERIC J. SIEBENMANN AND CHRISTIAN E. JOHNSON, OF MOLINE, ILLINOIS, ASSIGNORS TO DEERE & COMPANY, OF MOLINE, ILLINOIS, A CORPORATION OF ILLINOIS

AGRICULTURAL IMPLEMENT

Application filed May 6, 1929. Serial No. 360,979.

The present invention relates, generally, to agricultural implements, and particularly to that class of implements commonly known as rotary rod weeders, wherein a long revolving rod is drawn transversely through the soil below the surface thereof for uprooting the weeds or breaking the same from their roots.

One of the principal objects of the invention is to provide a new and improved construction whereby the depth of penetration at which the rotary rod operates may be adjusted and maintained with greater effectiveness and reliability. The forces set up in dragging this long span of rotary rod transversely through the ground are extremely large, and make it very difficult to adjust the depth of penetration, and to maintain a given depth adjustment. The improved method of adjustment herein disclosed resides principally in adjusting the front portion of the supporting frame vertically with respect to the two side wheels ordinarily supporting this front end. The rotary rod usually has spaced points of bearing support in shoes which are carried by the frame and which travel below the surface of the ground. The vertical adjustment of the front portion of the frame functions to vary the suck which these shoes exert on the rod tending to holding it down in the ground at a given penetration, and by varying this suck the depth of penetration may be adjusted and maintained with greatly increased effectiveness. This adjustment is preferably in the nature of a vertical or fore and aft tilting of the front portion of the supporting frame around a rearwardly disposed point, such as around the axes of the rear supporting wheel or wheels with which these implements are usually provided. While this constitutes the preferred manner of effecting the aforesaid depth adjustment, it will be understood that the invention is not limited thereto, as such variation of the suck of the shoes, and of the other forces influencing penetration, may be obtained by corresponding adjustment of only a part or parts of the frame or other shoe supporting members.

Another object of the invention is to provide new and improved means for mounting the rear supporting wheels, and for raising and lowering the rear portion of the frame relative to said wheels to bring the rotary rod out of or into operating position.

Other advantageous features will appear from the following description of a preferred embodiment of my invention illustrated in the accompanying drawings, in which:

Fig. 1 is a plan view illustrating the left side of our improved rod weeder;

Fig. 2 is a side view of the weeder shown in Fig. 1; and

Fig. 3 is an enlarged detail view taken approximately on the line 3—3 of Fig. 1, illustrating in full lines one adjusted position of the front portion of the frame and in dotted lines another adjusted position thereof.

The present construction is similar in some respects to that disclosed in the copending application of Christian E. Johnson, Serial No. 312,001 filed October 12, 1928 and reference will be hereinafter made to such copending application in the description of certain parts of the construction.

The frame of the implement is indicated as a whole by the numeral 4, and comprises front and rear transversely extending angle bars 5, 6, connected at their ends by longitudinally extending side bars 7 (only one of which is shown). The front and rear angle bars 5, 6 are also cross-connected at spaced points by intermediate longitudinally extending angle bars 8, and diagonal brace bars 9. A longitudinally extending central member or bar 10 is also suitably secured to the front and rear angle bars 5, 6, such central bar 10 being extended rearwardly beyond the rear frame bar 6, as shown in Fig. 1, to provide support for a seat spring 11 upon which is mounted a driver's seat 12. Also secured to this rearwardly extending bar 10 is a suitable foot rest 13.

The front portion of the frame is supported on two laterally spaced wheels 14, only that at the left side of Fig. 1 being shown.

One of these wheels 14 serves as a traction wheel for driving the rotary rod, the tread portion thereof having any suitable traction lugs or cleats mounted thereon. Such wheel is rigidly secured to a rotatable axle shaft 15 which is extended inwardly beyond the wheel and is suitably journaled in spaced brackets 16, 17 secured by bolts 18 to the side bar 7 and to the angle bar 8 which lies adjacent to said side bar, as shown in Figs. 1 and 3. The other supporting wheel at the right side of the frame may be mounted on a stub axle also provided with bracket plates 16 and 17 for adjustable attachment to the main frame. Each of the brackets 16, 17 is provided with a plurality of sets of spaced holes, each set being indicated at 19, 20 and 21 (Fig. 3), so that the longitudinally extending frame bars 7 and 8 may be secured to the bracket plates 16 and 17 by means of the bolts 18 in any one of three different elevated positions in effecting the depth adjustment of the rotary rod, as will be hereinafter described.

Rigidly secured to the intermediate longitudinal bars 8 in spaced relation across the width of the frame is a series of bars 22 extending rearwardly from the frame and curved downwardly and forwardly in gooseneck formation, each bar 8 and its attached bar 22 forming in effect a long curved beam. The lower ends of the bars 22 are adapted to carry the rotary rod 24 down into the ground, and to this end they are provided with shoe-like bearing housings 23 in which the rotary rod has bearing support. It will be observed from Fig. 2 that the forward ends of these shoe-like members are pointed and have sloping surfaces for producing the desired suck tending to hold the rod down in the ground.

The rotary rod extends across substantially the entire width of the machine and is arranged to be driven from the traction wheel 14 through suitable power transmission mechanism which will now be described, parts of which mechanism are disclosed in the aforementioned copending application of Christian E. Johnson.

Such transmission mechanism comprises a sprocket wheel 26 fixedly secured on the axle shaft 15 so as to rotate therewith, and said sprocket wheel is connected by a chain 27 with a second sprocket wheel 28 which is fixed on a shaft 29. The shaft 29 is journaled in bearings suitably supported in depending arms of a U-shaped bracket member 31 fixed to the underside of the transverse frame member 6. A brace 32 is fixed at one end to the member 7 and at its opposite end is secured to the inside depending arm of the U-shaped bracket 31. Pivotally mounted on one end of an arm 33 is an idler pulley 34, the opposite end of said arm being adjustably secured to the brace 32 at 35 (see Fig. 1). The adjustment of the idler pulley 34 through angular shifting of the arm 33 provides for taking up slack or wear in the chain and also accommodates the different adjustments of the front portion of the frame with respect to the axes of the front supporting wheels 14. Mounted on the outer end of the shaft 29 is a bevel gear 36, which bevel gear meshes with a second bevel gear 37 suitably mounted on a diagonally extending shaft 38. The shaft 38 is journaled in a suitable bearing in the outer depending arm of the U-shaped bracket, and is connected to the rotary rod 24 through a universal joint 39. A suitable guard 41 is secured to the outer depending arm of the U-shaped bracket, as best shown in Fig. 1.

The rear end of the frame is supported on two laterally spaced caster wheels 43 (only that one at the left side of the implement being shown in the drawings), said caster wheels being suitably journaled on vertical spindles 44. As the mounting of both these rear caster wheels is alike a description of the one illustrated will suffice.

Rigidly secured to the rear angle bar 6 of the frame is a pair of diagonal bars or members 35 which extend rearwardly from said frame bar and converge toward each other at their rear ends. Suitably bolted between the rear ends of said members 35 is a mounting member 46 which comprises a vertical sleeve 47 in which the spindle 44 is slidably and rotatably mounted. The sleeve member 47 is provided with two laterally extending perforated lugs 48 spaced apart as shown and between which a nut 49 is non-rotatably positioned. The upper end of the spindle 44 is reduced in diameter, as shown by dotted lines in Fig. 2, and on said reduced portion is rotatably mounted a casting 51 which is secured in position on the spindle by means of a washer and nut 53 engaging over the upper end of the spindle. The casting 51 is provided with a laterally extending lug portion 54 which forms a bearing sleeve for a screw crank 55.

The upper end of the screw crank is provided with a handle portion 56, and below the lug portion 54 of the casting 51 a collar 57 is pinned to the screw crank to hold the same in position, there also being a suitable flange or collar 58 on the screw crank to bear against the top of the lug portion 54. The threaded portion of the screw crank threads through the previously mentioned nut 49 which is positioned between the lugs 48 on the lower mounting member 46.

The rear portion of the frame is raised and lowered relatively to the rear supporting wheels 43 by means of the screw cranks 55, in the operation of raising the rotary rod to transport position and lowering the rod to operative position. Rotating the two screw cranks in one direction causes the nuts 49 to be threaded upwardly along the screw shafts for raising the frame, and rotating the screw cranks in the opposite direction causes these nuts to be threaded downwardly for lowering the frame. It will be noted that in such raising and lowering of the frame the entire frame structure pivots about the axes of the two front supporting wheels 14. The two rear supporting wheels 43 are free to caster in any of the different positions of the frame, and it will be noted from Fig. 1 that these wheels are positioned midway between the goose-neck beams 22 so that they will not strike such beams in their ordinary swinging movement.

The implement is pulled by means of two draft rods 61 (only that at the left side in Fig. 1 being shown), which pivotally connect with the rear portion of the implement frame at points adjacent to the sides thereof, as indicated at 62 in Fig. 1. The front ends of these draft rods have suspension mounting in elongated links 63 which are suspended from the front frame bar 6 by means of eye bolts 64. Draft chains 65 extend forwardly from said draft rods for connection with the teams or a tractor, these draft connections being more thoroughly described in the aforementioned copending application.

Referring now to the manner of adjusting the depth of penetration by inclination of the frame, when the two bars 7 and 8 at each side of the frame are bolted to the lower sets of holes 19 in the bracket plates 16, 17 the front end of the frame is in its lowest position of adjustment, extending more nearly horizontal, as represented by the full line position in Figs. 2 and 3. This causes the shoes and rotary rod to run at their greatest depth, the approximate relative depth of penetration of the rod at this time being indicated by the dotted line $x$ in Fig. 2. The angular position of the shoes 23 at this time is such that they exert a maximum suck for holding the rotary rod down in the ground at the desired depth. When it is desired to reduce the depth of penetration the front end of the frame is unbolted from the lower set of holes 19 and is raised for rebolting to either of the two upper sets of holes 20 or 21. The dotted line position of the frame in Figs. 2 and 3 illustrates the frame bolted to the uppermost set of holes 21. In thus raising the front end of the frame the rotary rod is bodily lifted to some extent relatively to the rear wheels 43, and the frame is inclined more sharply relatively to its former position. This inclination changes the angle of the shoes 23 and hence changes the suck substantially to the proper degree for retaining this lesser depth of penetration. The approximate relative penetration in such adjustment is indicated by the dotted line $y$ in Fig. 2.

In effecting the above described adjustments the front end of the frame swings upwardly or downwardly around a rearwardly disposed point.

In most instances the adjustment will be effected when the rotary rod has been raised out of the ground by the actuation of the crank screws 55, under which condition the rear wheels 43 will generally have firm bearing support on the ground. At this time the vertical swinging of the front end of the frame will occur around the axes of the rear wheels 43 as a pivot. In this improved construction of rod weeder, when the rotary rod is in operative position in the ground, the downward pressure on the rear wheels 43 is more nearly constant than in the majority of prior constructions. Hence if the front end of the frame should be vertically adjusted with the rod in the ground such adjustment will generally pivot around the axes of the rear wheels, but if these wheels should be out of firm contact with the ground the adjustment of the frame in pivoting about the axis of the rotary rod will nevertheless change the angle of suck of the shoes 23 and effect the desired adjustment upon forward motion of the implement. The height of the rear wheels 43 will generally be set to correspond with the different depth adjustments, so that these rear wheels will run on the surface of the ground when the rod is running at the depth for which the front adjustment is set.

If the soil becomes extremely hard the rod may tend to run out but such tendency will be counteracted by the weight of the rear part of the frame and the weight of the operator. If, on the other hand, the soil becomes extremely soft, under which condition the rod would tend to run deeper, such tendency is counteracted by the contact of the rear wheels with the ground.

While we have described what we regard as the preferred embodiment of our invention it will be understood that numerous changes and rearrangements may be made therein without departing from the essence of the invention. For example, any suitable lever or screw actuated adjusting mechanism may be connected between the axles 15 of the front wheels and the front end of the frame so that the frame can be adjusted while the implement is in operation, or, if desired, only a certain portion of the frame may be tilted, such as the curved bars 22.

We claim:

1. In a rotary rod weeder, the combination of a frame, supporting wheels for said frame, a transversely extending rotary rod carried by said frame and adapted to penetrate the ground, means for driving said rotary rod from one of said supporting wheels, and means including adjustable parts whereby the front portion of said frame is adapted to be adjusted vertically for varying the penetration of said rotary rod.

2. In a rotary rod weeder, the combination of a frame, supporting wheels for said frame, a transversely extending rotary rod carried by said frame and adapted to penetrate the ground, means for driving said rotary rod from one of said supporting wheels, and means adjustably mounting the front portion of said frame on said supporting wheels so that the frame can be tilted upwardly or downwardly about a rearwardly disposed point for varying the penetration of said rotary rod.

3. In a rotary rod weeder, the combination of a frame, supporting wheels for said frame positioned beyond the outer ends of said frame, a transversely extending rotary rod carried by said frame and adapted to penetrate the ground, means for driving said rotary rod, a ground engaging support for said frame in rear of said rotary rod, and means whereby the supporting wheels may be adjustably positioned relative to the frame for adjusting the front portion of said frame upwardly or downwardly about said ground engaging support for varying the penetration of said rod.

4. In a rotary rod weeder, the combination of a frame, front supporting wheels for said frame positioned beyond the outer ends of said frame, a transversely extending rotary rod carried by said frame and adapted to penetrate the ground, means for driving said rotary rod, rear supporting wheels for said frame, and means adjustably securing the front supporting wheels to the front portion of said frame whereby the latter may be tilted vertically about the axes of said rear supporting wheels for varying the depth of penetration of said rod.

5. In a rotary rod weeder, the combination of a frame, supporting wheels for said frame, a transversely extending rotary rod carried by said frame and adapted to penetrate the ground, ground engaging shoe members associated with said rotary rod, means for driving said rotary rod from the traction power of one of said wheels, and means adjustably connecting said frame with said latter wheel whereby vertical adjustment of said frame relatively to said wheel varies the suck of said shoe members.

6. In a rotary rod weeder, the combination of a frame, supporting wheels for said frame, a transversely extending rotary rod carried by said frame and adapted to penetrate the ground, means for driving said rotary rod, means permitting vertical adjustment of the front portion of said frame relatively to said supporting wheels, a rear supporting wheel, and means for adjusting the rear portion of the frame relatively to said rear supporting wheel.

7. In a rotary rod weeder, the combination of a frame, front supporting wheels for said frame, a transversely extending rotary rod carried by said frame and adapted to penetrate the ground, means for driving said rotary rod from one of said front supporting wheels, rear supporting wheels for said frame, means to secure vertical adjustment of the front portion of said frame around the axes of said rear supporting wheels, and means for vertically adjusting the rear portion of the frame around the axes of said front supporting wheels.

8. In a rotary rod weeder, the combination of a frame, supporting wheels for said frame, a transversely extending rotary rod carried by said frame and adapted to penetrate the ground, means for driving said rotary rod from one of said supporting wheels, ground engaging shoe members associated with said rotary rod, and means whereby said shoe members are tilted vertically about a point in rear thereof.

9. In a rotary rod weeder, the combination of a frame, supporting wheels for said frame, a transversely extending rotary rod carried by said frame and adapted to penetrate the ground, means for driving said rotary rod, shoe members adapted to run below the ground with said rotary rod and shape to exert a downward suck on said rod, and means whereby said shoe members are tilted vertically about a pivot center in rear thereof for varying the suck of said shoe members, a rear supporting wheel on the lower end of said spindle, a screw crank extending substantially parallel with said spindle, a cap mounted on the upper end of said spindle and in which said screw crank is rotatably mounted, and a nut carried by said mounting member and screwing over said screw crank.

10. In a rotary rod weeder, the combination of a frame, front supporting wheels for said frame, caster wheels for supporting the rear end portion of said frame, a transversely extending rotary rod, ground engaging shoe members associated with said rotary rod, means for adjusting the position of the forward end of said frame relatively to said front supporting wheels to vary the depth of penetration of said rotary rod and said shoe members, and means for raising and lowering said frame relatively to said rear caster wheels to raise and lower said rotary rod.

11. In a rotary rod weeder, the combination of a frame, front supporting wheels for said frame, caster wheels for supporting the rear end portion of said frame, a transversely extending rotary rod supported by said frame and adapted to penetrate the ground, ground engaging shoe members associated with said rotary rod, means for driving said rotary rod, means for shifting the frame by rotating it about a point in rear of said rod to vary the depth of penetration of said rod and said shoe members, and screw crank means for raising and lowering said frame relatively to said caster wheels to raise and lower said rotary rod.

12. In a rotary rod weeder, the combination of a frame, front supporting wheels for said frame, caster wheels for supporting the rear end portion of said frame, a transversely extending rotary rod supported by said frame and adapted to penetrate the ground, ground engaging shoe members associated with said rotary rod, means for driving said rotary rod, means for adjusting the position of the forward end of said frame relative to said front supporting wheels to vary the depth of penetration of said rotary rod and said shoe members, and screw crank means for raising and lowering said frame relatively to said rear caster wheels to raise and lower said rotary rod.

13. In a rotary rod weeder, the combination of a frame, axle shafts underlying the forward portion of said frame, supporting wheels on said shafts for supporting said frame, a transversely extending rotary rod supported by said frame and adapted to penetrate the ground, means for driving said rotary rod, brackets mounted on said axle shafts, and means for adjustably connecting said frame with said brackets permitting shifting of the position of said frame to vary the depth of penetration of said rod.

14. In a rotary rod weeder, the combination of a frame, front supporting wheels for said frame, caster wheels for supporting the rear end portion of said frame, a transversely extending rotary rod, ground engaging shoe members associated with said rotary rod, means adjustably connecting said frame with said front supporting wheels whereby said frame is tilted about a point in rear of said rod so as to vary the depth of penetration of said rod and said shoe members, and screw crank means connected with said caster wheels for raising and lowering the rear portion of said frame for raising and lowering said rotary rod.

15. In a rotary rod weeder, the combination of a frame, supporting wheels for said frame, a transversely extending rotary rod supported by said frame and adapted to penetrate the ground, means for driving said rotary rod, and means for shifting the frame by rotating it about a point in rear of said rod so as to change the depth of penetration of said rod, said means comprising a plate provided with a plurality of bolting holes therein at different heights for adjustably connecting the frame thereto.

16. In a rotary rod weeder, the combination of a frame, a transversely extending rotary rod carried by said frame and adapted to penetrate the ground, means for driving said rod, supporting wheels for the forward end of said frame, shafts on which said supporting wheels are respectively mounted, and means for securing said shafts to said frame, said means comprising a bracket mounted on each of said shafts and extending upwardly therefrom, and means for adjustably connecting said brackets with said frame to vary the position of said frame to change the depth of penetration of said rotary rod.

17. In a rotary rod weeder, the combination of a frame, supporting wheels for the front end portion of said frame, caster wheels for supporting the rear end portion of said frame, a transversely extending rotary rod supported by said frame and adapted to penetrate the ground, means for driving said rotary rod, spindles extending upwardly from said caster wheels, mounting sleeves carried by said frame and sliding along said spindles, crank screws extending substantially parallel with said spindles, and devices connecting each of said crank screws with its respective spindle and with said frame, one of said devices comprising a threaded member screwing over the crank screw.

18. In a rotary rod weeder, the combination of a frame, supporting wheels for the front end portion of said frame, rearwardly extending converging bars connected with said frame, a mounting member comprising a vertical sleeve connected with said bars, a spindle rotatably and slidably mounted in said sleeve, a rear supporting wheel on the lower end of said spindle, a screw crank extending substantially parallel with said spindle, a cap mounted on the upper end of said spindle and in which said screw crank is rotatably mounted, and a nut carried by said mounting member and screwing over said screw crank.

19. In a rotary rod weeder, the combination of a frame, supporting wheels for said frame, a transversely extending rotary rod carried by said frame and adapted to penetrate the ground, means for driving said rotary rod, ground engaging shoe members associated with said rotary rod, and means for simultaneously raising and decreasing the suck, or lowering and increasing the suck of said shoe members.

In witness whereof we hereunto subscribe our names this 30th day of April 1929.

FREDERIC J. SIEBENMANN.
CHRISTIAN E. JOHNSON.